United States Patent [19]

Clampitt et al.

[11] 3,785,437

[45] Jan. 15, 1974

[54] METHOD FOR CONTROLLING FORMATION PERMEABILITY

[75] Inventors: Richard L. Clampitt; James E. Hessert, both of Bartlesville, Okla.

[73] Assignee: Phillips Petroleum Company, Bartlesville, Okla.

[22] Filed: Oct. 4, 1972

[21] Appl. No.: 294,990

[52] U.S. Cl................. 166/281, 166/294, 166/295
[51] Int. Cl..................... E21b 33/138, E21b 43/27
[58] Field of Search................... 166/294, 295, 270, 166/300, 281

[56] References Cited
UNITED STATES PATENTS

| | | | |
|---|---|---|---|
| 3,308,885 | 3/1967 | Sandiford | 166/295 |
| 3,378,070 | 4/1968 | Wessler et al. | 166/294 X |
| 3,396,790 | 8/1968 | Eaton | 166/270 |
| 3,502,149 | 3/1970 | Pence, Jr. | 166/294 X |
| 3,603,397 | 9/1971 | Peray | 166/270 |
| 3,611,733 | 10/1971 | Eilers et al. | 166/294 X |
| 3,658,129 | 4/1972 | Lanning et al. | 166/294 X |
| 3,687,200 | 8/1972 | Routson | 166/275 |
| 3,727,687 | 4/1973 | Clampitt et al. | 166/294 X |

Primary Examiner—Stephen J. Novosad
Attorney—Quigg & Oberlin

[57] ABSTRACT

In the production of oil and gas, the production of undesirable fluids is inhibited by the sequential injection into the producing formation of alternating slugs of an aqueous composition containing at least one crosslinkable polymeric material and an aqueous composition containing no crosslinkable polymeric material, wherein the polymer-containing slugs have incorporated therein one component of a two-component catalyst system effective to cause in situ crosslinking of the polymeric material when contacted with a second component of such catalyst system, said second component being incorporated into the nonpolymer-containing slug.

18 Claims, No Drawings

METHOD FOR CONTROLLING FORMATION PERMEABILITY

This invention relates to the production of oil and natural gas. More particularly, the invention relates to methods for controlling the concomitant production of undesirable fluids from oil and gas-bearing reservoirs.

One of the more significant problems attendant to the production of oil and gas from subterranean hydrocarbon-containing formations is the concomitant production of undesirable materials. One such undesirable material is water. Such produced water can be reservoir water, occasioned by coning or such similar phenomena of the aquifer or it can be injection water from secondary recovery treatments being applied to the reservoir. Whatever the source, there is an upper limit beyond which water production can no longer be tolerated and its further entry into the producing well bore must be at least reduced if further production of the hydrocarbon resources at that location is to be continued. Another such undesirable material can be gas. While normally gas which is produced in association with petroleum liquids is separated from such liquids and recovered for subsequent use, e.g., as natural gas for residential and commercial use, as an energy source for the production of petroleum, for gas repressuring of reservoirs, etc., there is for gas, as for water, an upper limit of gas-oil ratio beyond which the continued production of gas in association with petroleum liquid cannot be tolerated. Such upper limits may be set, inter alia, by solubility limits of the gas in the oil at reservoir conditions, equipment limitations, executive directive of an appropriate regulatory agency, or considerations relating to the most efficient manner of producing hydrocarbon liquids from the formation or reservoir.

Regardless of whether the undesired fluid is a natural drive fluid such as water or gas, or an artificial drive fluid such as from secondary recovery liquid or gas drive projects, gas repressurization, miscible displacement projects, etc., the problem is primarily occasioned by the predilection of the natural or artificial drive fluid to preferentially seek the higher permeability zone and to more or less bypass the lower permeability zones.

Among the prior solutions to the problem of undesirable fluid entry is the placing or forming of a plug within the formation. At one time such plugs were of a solid nature, such as cement, regardless of whether the undesirable fluid were liquid or gas. Such solid plugs, while at least partially effective for the intended purpose, inhibit the use of the undesirable fluid to assist in driving the desired fluid from the formation into the producing well bore. In addition, the use of such solid plugs invariably results in the permanent loss of desired fluids. Further, should the undesirable fluids seep by or otherwise bypass such solid plugs, the plug cannot change or shift position to block such seepage or other changes in flow pattern of the undesired fluid.

To overcome the shortcomings of the use of solid plugs such as cement, there has developed the concept of modifying the mobility of fluids present in the subterranean formations. Such methods have generally been directed to modifying the mobility of the hydrocarbon-displacing medium, whether it be a gas or liquid. The mobility of any fluid in a permeable geological formation is the effective permeability of the formation to that liquid divided by the viscosity of the fluid. Thus, a commonly developed method for reducing the mobility of a particular fluid in a permeable geological formation is to increase its viscosity such as by using viscous solutions of partially hydrolyzed polyacrylamides such as described in U.S. Pat. Nos. 2,827,964 and 3,039,529.

Another solution to the problem of undesirable fluid entry is taught by Sandiford in U.S. Pat. No. 3,308,885, where it is recommended that aqueous solutions of high molecular weight polyacrylamides are effective for reducing the water-oil ratio in the total well effluent and for increasing the daily production rate of hydrocarbonaceous fluids. The partially hydrolyzed polyacrylamides in the Sandiford patent are those wherein at least about 8 percent, but not more than about 70 percent, of the amide groups have been hydrolyzed to carboxylic acid groups. Following injection of the aqueous solution containing the polyacrylamide into the formation, the well is then placed back on production; and it is found that, under the same conditions as were employed prior to the treatment, there is a substantial reduction in water-oil ratio of the well effluent, due primarily to a reduced flow rate of water into the well bore. Moreover, as a result of this decreased water flow rate, there will be, at the same gross production rate, a reduction in fluid level over the pump, with resultant decrease in back pressure on the formation, thus permitting oil to move more rapidly out of the formation into the well bore. Thus, although the immediate effect of the treating process of this Sandiford patent is to decrease the rate of flow of water into the well bore, a secondary effect of increasing the absolute daily production rate of oil is also obtainable.

In the actual field practice of the aforementioned method by Sandiford, a disadvantage has been observed. The adsorbed and entrapped polymers elute out of the producers very quickly, 15 to 150 days, and the water-oil ratios will rise rapidly back to an undesirable level necessitating retreatment of the producers with the solutions of polyacrylamides.

It is an object of this invention to improve over the method outlined in U.S. Pat. No. 3,308,885 by gelling a part or all of the aqueous polymer solutions in situ in order to prevent the gels so created from being produced back in a short period of time. This improved method will provide larger water diversion effects and for longer periods of time.

It is another object of the present invention to provide a method for modifying the fluid permeability of hydrocarbon-containing subterranean formations.

It is another object of the invention to provide a method for reducing the mobility of water or gas in a permeable geological formation, particularly such formations containing recoverable hydrocarbon fluids.

These and other objects, advantages and aspects of the invention will be readily apparent to persons skilled in the art from a study of the disclosure and the appended claims.

In accordance with the present invention, there is provided a method for modifying the fluid permeability of subterranean geological formations, particularly such formations containing recoverable hydrocarbon fluids. Broadly, the fluid permeability of such subterranean geological formations penetrated by one or more injection and/or producing well bores can be modified by treating such formations through such well bores with aqueous compositions comprising crosslinkable, at least water-dispersible, polymers under conditions such that crosslinking or gellation of the polymer is effected in situ within the formation.

More particularly, in accordance with the present invention, the fluid permeability of hydrocarbon-containing subterranean geological formations is modified by a method comprising treating the formation with aqueous compositions containing chemically crosslinkable, at least water-dispersible, polymers under conditions wuch that crosslinking or gellation of the polymer is catalytically effected in situ within the formation. In accordance with the invention, the formation is sequentially treated with at least one aqueous composition comprising at least one chemically crosslinkable, at least water-dispersible, polymer and at least one aqueous composition containing no crosslinkable polymer; wherein the crosslinking of the polymer(s) is effected chemically in situ within the formation, with the crosslinking or gellation of the polymeric material being effected by a redox catalyst system, i.e., a system comprising a suitable reducing component and an oxidizing component comprising a reducible polyvalent metal. It is important that the oxidizing component of the redox system be at the highest level of oxidation, e.g., if the oxidizing component is polyvalent chromium, the chromium must be in its highest valence state. In addition to being at the highest valence state, the oxidizing component polyvalent metal must be in a form in which it is not readily available to effect crosslinking of the polymer until such oxidizing component comes into contact with the reducing component in the presence of the crosslinkable polymeric compositions. In other words, the oxidizing ion is in a nonreactive form such as by virtue of association with another element such as oxygen until contacted by the reducing component in the presence of crosslinkable polymer. Either one but not both of the oxidizing component or the reducing component is incorporated into the aqueous polymer compositions with the component not present in the polymer compositions being incorporated into the nonpolymer-containing aqueous compositions. Although presently not preferred, the nonaqueous polymer compositions can have incorporated therein both the reducing and oxidizing components, providing that there is an excess of the component which is not present in the polymer-containing compositions. The aqueous compositions which contain essentially no crosslinkable polymeric material preferably have additionally incorporated therein one or more multivalent cations such as $calcium^{+2}$, $magnesium^{+2}$, $ferric\ iron^{+3}$, $aluminum^{+3}$, $titanium^{+4}$, $zinc^{+2}$, $tin^{+4}$ and $chromium^{+3}$, with the superscript numbers representing the metal valence.

Thus, according to the present invention, there is provided a method for reducing fluid permeability of a porous hydrocarbon-containing subterranean formation comprising: introducing into said formation a first aqueous composition containing a crosslinkable, at least water-dispersible polymer and a sensible amount of either one but not both of the oxidizing and reducing components of a redox catalyst system, said oxidizing component comprising a polyvalent metal ion which is reducible to a lower polyvalent valence state, or the reducing component of a redox catalyst system, said reducing agent being capable of reducing said polyvalent metal ion of said oxidizing component to said lower polyvalent valence state; terminating the introduction into said formation of said first aqueous composition; introducing into said formation a seocnd aqueous composition containing that component of of said redox catalyst system not present in said first aqueous composition, said second aqueous composition containing no crosslinkable polymer; terminating the introduction of said second aqueous composition; and maintaining said compositions in a quiescent state for a period of time to effect mixing of said first and second aqueous compositions and in situ crosslinking or gellation of said polymeric materials. If desired, the treatment order can be reversed. More than one aqueous composition containing crosslinkable polymer and one but not both of the oxidizing component or the reducing component of the redox catalyst system can be employed; as can one or more of the aqueous compositions containing that component of the redox catalyst system not present in said first aqueous composition and containing no crosslinkable polymer. In this case, each treatment of the formation with an aqueous composition containing crosslinkable polymer is followed by the introduction of an aqueous composition containing no crosslinkable polymer, except for the ultimate or last of such treatment, when the use of an aqueous scomposition containing no crosslinkable polymer is optional. In this invention, the use of more than one aqueous composition containing crosslinkable polymer, as well as the use of more than one aqueous composition containing no crosslinkable polymer, can be dispensed with if sufficient permeability reduction can be attaned from the in situ crosslinking or gellation of a single aqueous composition containing crosslinkable polymeric material.

In the practice of this invention, the aqueous composition containing the described components can be injected into the formation employing conventional pumping equipment. If desired, said compositions can be injected into a selected portion or portions of the formation. When the formation is a subterranean formation penetrated by a well bore, said selected portion(s) can be isolated by employing one or more isolation means at the proper location, such as by the use of packers, bridge plugs and other methods known in the art.

When the aqueous compositions used in the practice of the invention are injected down a well bore into a subterranean formation, it may be desirable to follow the last aqueous composition with a slug of flush liquid such as water or oil, e.g., in a producing well treatment to reduce the water-oil ratio. Lease crude oil could be used to flush the well casing and the near-well bore zone of the formation to reestablish the relative permeability to oil of the formation in the area immediately adjacent and surrounding the well bore. The flush liquid should be at least sufficient to clear the perforations. Otherwise, the perforations could be blocked or partially restricted when the polymeric compositions mix and crosslink to a more viscous or firm gel. Water would be used in the flushing operation if the well were a water injection well in a secondary recovery process. Oil would be used as the flushing liquid if the well were an oil and/or oil- and gas-producing well.

After the aqueous compositions have been placed in the formation, and the casing, perforations and well bore area cleared, it is preferred to shut in the well and maintain the aqueous compositions in a quiescent state for a period of time sufficient to permit the polymeric material to sufficiently intermix with the individual components of the redox catalyst system and crosslink

*in situ*. Thus, for example, the well would preferably be shut in for a period of about 8 hours to about 10 days or longer, preferentially about 1 to about 7 days, before resuming injection of the drive fluid if the well through which the treatment is effected is an injection well, or before resuming production of hydrocarbons if the well is a producing well. Shut-in periods outside the stated range can be employed if desired or necessary, depending upon the particular polymeric compositions used, the reducing component and oxidizing component employed, and the nature of the formation being treated. It has been found that such in situ mixing of the various components more effectively controls the degree of gellation of the polymers. Mixing of the components due to fingering appears to be enhanced in the formation when the viscosities of the various component compositions are widely different.

In some instances, depending upon the type of formation and the nature of the undesirable fluid, deeply placed compositions, e.g., compositions displaced out into the formation away from the treating well a distance of about 10 to about 200 feet or more, can be employed. Thus, in one embodiment of the invention, the afterflush of water or other liquid such as oil, e.g., lease crude oil, would be sufficient to not only clear the perforations but also would be sufficient to displace the compositions out into the formation a predetermined desired distance. This embodiment is particularly useful where there are natural or artificially induced fracture systems occupying a relatively small portion of the formation adjacent the well bore.

The amount of the aqueous compositions and the concentrations of the individual components used in the practice of the invention are functions of the type of formation being treated, the porosity and permeability of such formations, and, particularly, the level of permeability modification desired. Generally speaking, the use of any suitable amount is well within the scope of the invention, both as to initial treatments and to retreatments. Thus, the invention is not limited to the use of any particular amount of said aqueous crosslinkable polymeric compositions as the permeability modifying medium. The reservoir permeability in a particular formation can be determined by methods known in the art. For example, a known-sized slug of water containing a marking agent such as a water-soluble or dispersible dye can be injected, followed by continued injection of water until the marking agent is detected at the offending producing well. The amount of following water so injected will provide an estimate of the reservoir pore volume that is channeling the injection fluid between the injection well and the producing well plus enable an approximation of the formation flow capacitance of this portion of the reservoir. Radioactive tracers can be similarly employed as are dyes as marking agents or materials.

The aqueous compositions used in the practice of the invention can be injected at any suitable rate and at any suitable pressure. Usually, the injection rate will be within the range of from 0.1 to 50 barrels per minute, preferably 0.5 to 5.0 barrels per minute. If desired, the injection pressure can be sufficient to overcome the weight of the overburden and open a fracture, maintain the fracture open, and thus facilitate placement of the aqueous compositions. A previously created fracture could also be reopened to facilitate injection of the aqueous compositions. Use of such increased injection pressures will depend upon the nature of the formation being treated and its permeability. If such increased pressures are used, the release of the pressure and a reduction of injection rate will allow the fracture to close and subject the aqueous compositions to the overburden pressure, thereby aiding in holding the aqueous compositions in place.

Another embodiment of the invention comprises a combination acidizing-plugging treatment. This embodiment of the invention is particularly useful where the formation is susceptible to attack by an acid, such as a limestone formation. In this combination method, the injection of the aqueous compositions of the various components is preceded by a slug of acid sufficient to penetrate into the reservoir rock any desired distance, depending upon the type of formation and permeability thereof. The acid will react with, etch and roughen the rock faces. This will provide a clean and more oil-free rough surface for the aqueous compositions following crosslinking of the polymeric materials to adhere to. It is generally recognized that water-dispersible polymers will adsorb at much higher levels on rock surfaces free of oil. The slug of acid can be permitted to remain in the vicinity of the following aqueous compositions of various components and leak off naturally. Or, if desired, the injected acid slug can be followed immediately with a water flush to displace the acid. If the acid is permitted to leak off naturally, it is then desirable to inject sufficient water to flush the spent or partially spent acid some further distance into the reservoir prior to injecting the aqueous compositions of the invention.

Acids useful in the combination acidizing-plugging embodiment of the invention include any acid which is effective in increasing the flow of hydrocarbons through the formation and into the well. Examples of such acids which can be used include inorganic acids such as hydrochloric acid, nitric acid, and sulfuric acid; organic acids such as acetic acid and formic acid; and combinations of inorganic and organic acids.

The concentration or strength of the acid can vary depending upon the type of acid, the type of formation being treated, and the result desired in the particular treating operation. For example, when hydrochloric acid solution is being used in predominantly limestone formation, the concentration can vary from about 5 to about 38 weight percent hydrochloric acid, with concentrations within the range of 10 to 30 weight percent usually preferred. Organic acids are usually used in lower concentrations, e.g., about 10 weight percent. One preferred mixture of inorganic acid and organic acid comprises mixtures of hydrochloric acid and acetic acid, for example, 15 percent hydrochloric acid solution containing sufficient acetic acid to bring the total acidity to about 20 to 22 percent, based on equivalent hydrochloric acid dissolving capacity. The acids used in the practice of the invention can contain any of the known corrosion inhibitors, deemulsifying agents, sequestering agents, surfactants, friction reducers, etc., known in the art. The amount of acid used in any particular instance will depend upon a number of factors, including the size or amount of formation to be treated, type of formation being treated, the type of acid, the concentration of the acid and the formation temperature. Thus, the invention is not limited to using any particular amount of acid in the combination fracturing-acidizing embodiment of the invention. Any suitable amount of acid, depending upon the nature of the formation being treated and its permeability, can be employed.

When the combination acidizing-plugging treatment is not employed as described above, it will sometimes be desirable to precede the injection of the aqueous compositions with a small slug of acid to clean the well bore, perforations and the foramtion immediately adjacent the well bore. This can be followed by a small slug of hydrocarbon solvent, if desired, to remove the oil and thus increase polymer retention in the reservoir for subsequent crosslinkings.

The polymeric materials which are suitable for use in the practice of the invention include at least one chemically crosslinkable, at least water-dispersible polymer selected from the group consisting of polyacrylamides and related polymers, cellulose ethers, and polysaccharides which can be crosslinked or gelled in an aqueous medium with the catalytic gelling agents described herein. Where used, in the specification and in the claims, unless otherwise specified, the term "polymer" is employed generically to include both homopolymers and copolymers; and the term "water-dispersible polymers" is employed to include those polymers which are truly water-soluble and those which are dispersible in water or other aqueous medium to form stable colloidal suspensions which can be crosslinked as described herein.

The polyacrylamides and related polymers which can be employed in the practice of the present invention include at least one chemically crosslinkable, at least water-dispersible polymer which can be used in an aqueous medium with the catalytic gelling agents hereinafter described to give an aqueous gel; said polymers being selected from the group consisting of: polyacrylamides and polymethacrylamides wherein up to about 75 percent of the carboxamide groups can be hydrolyzed to carboxyl groups; crosslinked polyacrylamides and crosslinked polymethacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substitutents which contain from one to four carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and admixtures of such polymers. Presently preferred polyacrylamide-type polymers include the various substantially linear homopolymers and copolymers of acrylamide and methacrylamide. By substantially linear it is meant that the polymers are substantially free of crosslinking between the polymer chains. Said polymers can have up to about 75, preferably up to about 45, percent of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, providing said salts are at least water-dispersible. Such salts include the ammonium salts, the alkali metal salts, and others which are at least water-dispersible. Hydrolysis can be carried out in any suitable fashion, for example, by heating an aqueous solution of the polymer with a suitable amount of sodium hydroxide.

Substantially linear polyacrylamides can be prepared by methods known in the art. For example, the polymerization can be carried out in aqueous mediums, in the presence of a small but effective amount of a water-soluble oxygen-containing catalyst, e.g., a thiosulfate or bisulfate of potassium or sodium hydroperoxide at a temperature between about 30° and 80° C. The resulting polymer is recovered from the aqueous medium, as by drum drying, and can be subsequently ground to the desired particle size. A presently preferred particle size is such that about 90 weight percent will pass through a No. 10 mesh sleeve, and not more than about 10 weight percent will be retained on a No. 200 mesh sieve (U.S. Bureau of Standards Sieve Series).

Included among the copolymers which can be used in the practice of the invention are the at least water-dispersible copolymers resutling from the polymerization of the major proportion of acrylamide or methacrylamide and a minor proportion of an ethylenically unsaturated monomer copolymerizable therewith. It is desirable that sufficient acrylamide or methacrylamide be present in the monomer mixture to impart to the copolymer the above-described water-dispersible properties, for example, from about 90 to about 99 percent acrylamide and from about 1 to 10 percent other ethylenically unsaturated monomers. Such monomers include acrylic acid, methacrylic acid, vinyl sulfonic acid, vinyl benzyl sulfonic acid, vinyl benzene sulfonic acid, vinyl acetate, acrylonitrile, methylacrylonitrile, vinyl alkyl ether, vinyl chloride, maleic anhydride, and the like. Various methods are known in the art for preparing such copolymers, e.g., see U.S. Pat. Nos. 2,625,529; 2,740,522; 2,729,557; 2,831,841; and 2,909,508. Such copolymers can be used in the hydrolyzed form, as discussed above for the homopolymers.

Polyacrylic acids, including polymethacrylic acid, prepared by methods known in the art can also be used in the practice of the invention.

Polyacrylates, e.g., as described in Kirk-Othmer, "Encyclopedia of Chemical Technology," Vol. 1, second edition, pages 305 et seq., Interscience Publishers, Inc., New York (1963), can also be used in the practice of the invention. Examples of such polyacrylates include polymers of methylacrylate, ethylacrylate, N-propylacrylate, isopropylacrylate N-butylacrylate, isobutylacrylate, tert-butylacrylate, N-octylacrylate, and the like.

Polymers of N-alkyl-substituted acrylamides wherein the nitrogen atoms and the carboxamide groups can have from 1 to 2 alkyl substituents which contain from one to four carbon atoms can also be used in the practice of the invention. Examples of such N-substituted acrylamides include, among other, N-methylacrylamide, N-propylacrylamide, N-butylacrylamide, N,N-dimethylacrylamide, N-methyl-N-sec-butylacrylamide, and the like, at various stages of hydrolysis, as described above.

Crosslinked polyacrylamides and crosslinked polymethacrylamides at various stages of hydrolysis as described above can also be used in the practice of the invention. In general, said crosslinked polyacrylamides can be prepared by the methods described above but including in a monomeric mixture a suitable amount of a suitable crosslinking agent. Examples of crosslinking agents include methylenebisacrylamide, divinylbenzene, vinyl ether, divinylether, and the like. Said crosslinking agents can be used in small amounts, e.g., up to about 1 percent by weight of the monomeric mixture. Such crosslinking is to be distinguished from any crosslinking which occurs when solutions of polymers are gelled as described herein. Mixtures of the above-described polymers can also be used in the practice of the invention.

Representative cellulose ethers which can be used in the practice of the present invention include, inter alia, the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hdyroxyethyl cellulose (CMHEC); hydroxyalkyl celluloses such as hydroxyethyl cellulose and hydroxypropyl ecellulose; alkylhydroxylakyl celluloses such as methylhydroxypropyl cellulose; alkyl celluloses such as methyl cellulose, ethyl cellulose, and propyl cellulose; alkylcarboxylakyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commerically in various grades. The carboxy-substituted cellulose ethers are available as the alkali metal salt, usually the sodium salts. However, the metal is seldom referred to and they are commonly referred to as CMC, CMHEC for carboxymethylhydroxyethyl cellulose, etc. For example, water-soluble CMC is available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable. CMC having a degree of substitution greater than the above-preferred ranges usually has a lower viscosity and more is required in preparing suitable aqueous compositions. Said degree of substitution of CMC is commonly designated in practice as CMC-7, CMC-9, CMC-12, etc., wherein the 7, 9, and 12 refer to a degree of substitution of 0.7, 0.9 and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in preparing the aqueous compositions used in the practice of the invention can vary widely depending upon the viscosity, grade and purity of the ether and properties desired in the aqueous compositions of the invention. In general, the amount of cellulose ether used will be at least a water-thickening amount, i.e., at least an amount which will significantly thicken the water to which it is added. For example, amounts in the order of 25 to 100 parts per million by weight (0.0025 to 0.01 weight percent) have been found to significantly thicken water. Water containing 25 ppm of CMC has a viscosity increase of about 21 percent. At 50 ppm the viscosity increase in about 45 percent. At 100 ppm the viscosity increase is about 195 percent. Generally speaking, amounts in the range of from about 0.0025 to about 5.0, preferably from about 0.01 to about 1.5, weight percent, based on the weight of water, can be used as thickening amounts. Amounts outside these ranges can also be used. Amounts within said preferred ranges provide aqueous compositions which are better suited for the plugging operations described herein than are the more dilute or more concentrated compositions which can be prepared. Amounts of cellulose ether within the above ranges provide aqueous compositions which develop good gel strength when crosslinked *in situ* within the formation.

Representative of the polysaccharides which can be used in forming the polymeric compositions of this invention are the heteropolysaccharides produced by fermentation of carbohydrates by bacteria of the genus Xanthomonas. Exemplary of such heteropolysaccharides are those produced by Xanthomonas campestris, Xanthomonas begonia, Xanthomonas phaseoli, Xanthomonas hederae, Xanthomonas incanae, Xanthomonas carotae, and Xanthomonas translucene. Of these, ionic polysaccharide B-1459 is preferred. The polysaccharide B-1459 is prepared by culturing the bacterium Xanthomonas campestris NRRL B-1459, United States Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28° C. Polysaccharide B-1459 is commercially available under the trade name of "Kelzan" from the Kelco Company, San Diego, California.

All the polymers useful in the practice of the invention are characterized by high molecular weight. The molecular weight is not critical so long as the polymer has the above-described at least water-dispersible properties. It is preferred that the polymer have a molecular weight of at least 100,000. The upper limit of molecular weight is unimportant so long as the polymer is at least water-dispersible. Thus, polymers having molecular weights as high as 20,000,000 or higher, and meeting said conditions, can be used.

The amount of such polymers used in the practice of the invention can vary widely depending upon the particular polymer used, the purity of said polymer and properties desired in the resulting aqueous crosslinked compositions. In general, the amount of polymer used in preparing the aqueous compositions will be a water-thickening amount, i.e., at least an amount which will significantly thicken the water to which it is added. Generally speaking, amounts in the range of 0.0025 to 5, preferably 0.01 to 1.5, weight percent, based upon the weight of water or aqueous medium, can be used in the practice of the invention. However, amounts outside these ranges can be employed.

The oxidizing component of the redox catalyst systems which are used in the practice of the invention are water-soluble compounds of polyvalent metals wherein the metal is present in its highest valence state, is capable of being reduced to a lower polyvalent state, and is in a form normally unavailable for reaction, such as combined with oxygen. Examples of such compounds include potassium permanganate, sodium permanganate, ammonium dichromate, the alkali metal chromates and dichromates, and chromium trioxide. Sodium dichromate and potassium dichromate, because of low cost and ready availability, are the presently preferred oxidizing components for use in the catalyst systems of the present invention. The hexavalent chromium in the chromium compounds is reduced *in situ* to trivalent chromium by suitable reducing agents, as discussed hereinafter. In the permanganage compounds the manganese is reduced from +7 valence to +4 valence.

The amount of oxidizing component used in the practice of the invention will be a sensible amount, i.e., a small but finite amount which is more than incidental impurities, but which is effective or sufficient to cause subsequent gellation when the metal in the oxidizing component is reduced to a lower polyvalent valence state. The lower limit of the concentration of the starting oxidizing component will depend upon several factors including the particular type of polymer or mixture of polymers used, the concentration of the crosslinkable polymer or polymers in the water, the water which is used, and the type of crosslinked product desired. Also, the fraction of polymer which is desired to be crosslinked can control the amount of oxidizing component. For similar reasons, the upper limit on the concentration of the oxidizing component of the redox catalyst systems also cannot always be defined. However, as a general guide, the amount of the starting oxidizing components used in preparing the crosslinked compositions in accordance with the invention will be in the range of from 0.05 to 75, preferably 0.5 to 40, weight percent of the amount of polymer used. Stated another way, the amount of the starting oxidizing component of the redox catalyst systems will usually be in an amount sufficient to provide at least $3 \times 10^{-6}$, preferably at least $3 \times 10^{-5}$, gram atoms of said metal capable of being reduced per gram of polymer. Preferably, the amount of metal capable of being reduced which is used will not exceed $4 \times 10^{-3}$, more preferably $2 \times 10^{-3}$, gram atoms of said metal per mol of polymer. However, in some situations, it may be desirable to use amounts of starting polyvalent metal-containing oxidizing components which are outside the above ranges. Such use is within the scope of the invention. Those skilled in the art can determine the amount of starting polyvalent metal-containing oxidizing agent to be used by simple experiments carried out in the light of this disclosure. For example, when brines, such as are commonly available in producing oil fields, are used in the water tin preparing gels for use in the practice of the invention, less of the starting polyvalent metal-containing oxidizing compound is required than when distilled water is used. Stable gels have been prepared using brines having a wide range of dissolved solid content, e.g., from 850, 1,200, 6,000, and 100,000 ppm total dissolved solids, depending upon the particular polymer and brine used. Gellation rates are frequently faster when using oil field brines. Such oil field brines commonly contain varying amounts of sodium chloride, calcium chloride, magnesium chloride etc. Sodium chloride is usually present in the greatest concentration. The work "water" is used generically herein and in the claims, unless otherwise stated, to include such brines, fresh water, and other aqueous media which can be gelled in accordance with the invention.

Suitable agents for use as the reducing component in the practice of the present invention include sulfur-containing compounds such as sodium sulfide, sodium hydrosulfite, sodium metabisulfite, potassium sulfite, sodium bisulfite, potassium metabisulfite, sodium sulfite, sodium thiosulfate, ferrous sulfate, thioacetamide, hydrogen sulfide, including hydrogen sulfide naturally present in the formation being treated, and others; and nonsulfur-containing compounds such as hydroquinone, ferrous chloride, para-hydrazinobenzoic acid, hydrazine phosphite, hydrazine dichloride, and others. Some of the above reducing agents act more quickly than others, for example, sodium thiosulfate usually reacts slowly in the absence of heat, e.g., heating to about 125° to 130° F. The presently most preferred reducing agents are sodium bisulfite, sodium hydrosulfite or potassium hydrosulfite, and hydrogen sulfide which is a sour gas. Many reservoirs contain the sour gas which would be a suitable reducing agent.

The amount of reducing agent to be used in the practice of the invention will also be a sensible amount, i.e., a small but finite amount which is more than incidental impurities, but which is effective or sufficient to reduce at least a portion of the higher valence metal in the starting polyvalent metal oxidizing components to a lower polyvalent valence state. Thus, the amount of reducing agent to be used depends, to some extent at least, upon the amount of the starting polyvalent metal-containing oxidizing component which is used. In many instances, it will be preferred to use an excess of reducing agent to compensate for dissolved oxygen in the water, exposure to air during preparation of the compositions, and possible contact with other oxidizing substances such as might be encountered in field operations. As a general guide, the amount of reducing agent used will generally be within the range of from 0.1 to at least 300, preferably at least about 200, weight percent of the stoichiometric amount required to reduce the metal in the starting polyvalent to said lower polyvalent valence state, e.g., +6 chromium to +3 chromium. However, in some instances, it may be desirable to use amounts of reducing agent outside said ranges. The use of such ranges is within the scope of the invention. Those skilled in the art can determine the amount of reducing agent to be used by simple experiments carried out in the light of this disclosure.

Various methods can be used for preparing the aqueous compositions used in the practice of the present invention. A convenient method is to first mix the polymer in the water or other aqueous medium. Either the metal-containing oxidizing component or the reducing component of the redox catalyst systems, but not both, is then added to the dispersion or solution of polymer, with stirring. A separate aqueous composition is prepared by adding to an aqueous medium containing no polymer the oxidizing component or the reducing component, as the case may be, which was not included in the aqueous polymer compositions. If desired, the aqueous compositions which contain no polymer can have added thereto both components of the redox catalyst system, providing the component of such systems which was not employed in the aqueous polymer-containing compositions is employed in excess, in order that there be present in the solution sufficient oxidizing or reducing agent, as the case may be, to react with the single component of the redox system which is contained in the aqueous polymer-containing compositions. The various compositions are then pumped into contact with the formation in accordance with the present invention by displacing at least one batch of aqueous composition containing polymer followed by an aqueous composition containing no polymer. Said sequential batch-type treatment can be continued to produce gellation of polymer in situ as often as desired, providing that, in each instance, the aqueous polymer-containing compositions are separated by the aqueous compositions which contain no polymer. In accordance with the present invention, the crosslinking of the polymeric material is effected at controlled conditions by the nascent metal ions formed in situ through reduction of the oxidizing component of the redox system by the reducing component. The crosslinked polymer compositions and gels resulting from catalytic crosslinking in the presence of such nascent ions have much better long term stabilities than do crosslinked compositions prepared by the direct addition of the multivalent crosslinking ions, such as the direct addition of trivalent chromium to a polymer solution. Gels formed by this direct addition are usually short-lived and unstable, and sometimes the gels break down leaving precipitates.

Gel instability is evidenced by precipitation and/or syneresis (bleeding or water separation). A severe test of a gel or crosslinking stability is to prepare the crosslinked polymer then merely allow the compositions to stand. It has been found that gels which are stable for as long as 48 hours are usually stable for a month or longer. It has also been found that formation solids such as sandstone and limestone improve gel stability.

An advantage of the present invention is that ordinary ambient temperatures and other conditions can be used in practically all instances in preparing the aqueous compositions used in the practice of the present invention. The present crosslinked polymer treatments are particularly useful in fluid drive operations for the secondary recovery of oil. Such crosslinked polymer compositions are applicable for decreasing the mobility of a fluid drive, such as water or other fluids, or decreasing the permeability of nonfractured porous formations prior to or during secondary recovery operations, such as fluid drive processes, as well as for water shutoff treatments in producing wells. In such processes the aqueous compositions can be introduced into the formation prior to or subsequent to another injected fluid. For example, in one particular useful application the aqueous compositions of the present invention can be injected after a previously injected slug of a fluid such as a detergent and/or oil-containing fluid which serves to loosen the oil from the formation. Following placement in the formation, the aqueous compositions of the present invention can then be followed by water to push such compositions toward the production well. In one embodiment of the invention, a conventional waterflood or gas drive can be carried out in conventional manner until the drive fluid breaks through into the production well in excessive amounts. Aqueous compositions in accordance with the present invention can then be pumped down the well and into the porous formation in any suitable manner, in any suitable amount, and for any desired period of time sufficient to obtain the desired in-depth penetration and decrease in mobility of the drive fluid, or decrease in permeability of the high permeability zones of such formations. Usually, an in-depth penetration of from 10 to 1,000, preferably 20 to 500, feet from the injection well will be sufficient. However, this can vary from formation to formation and penetration outside said ranges can be used. For example, there can be injected in accordance with the present invention via the injection well into the formation from about 0.0001 to about 0.5 pore volume of aqueous compositions in accordance with the invention over a suitable period of time ranging from one day to six months. Or, the injection of the aqueous compositions can be carried out by injecting alternating slugs of about 50 to 5,000 barrels of aqueous composition in accordance with the invention into the well and then into the formation.

In another embodiment of the invention, the porous formation can be treated prior to carrying out the fluid drive secondary recovery operations. This embodiment is particularly applicable where there is a good knowledge of the nature of the formation. Thus, in such a formation, where the oil-bearing strata are interspersed with more permeable porous strata which contain no oil, or an insufficient amount of oil to make secondary recovery operations economical, but which more permeable state strata would still act as a thief zone, the formation can be treated in accordance with the invention prior to initiating the fluid drive operation.

In still another embodiment, the invention can be applied to producing wells, either oil wells or gas wells, where there is a more porous nonhydrocarbon-bearing strata adjacent the hydrocarbon-bearing strata. For example, such a condition can exist where there is a water sand or previously waterflooded sand adjacent the hydrocarbon-bearing sand and the water intrudes into the bore hole and interferes with the production of hydrocarbon. In the same manner, there can also exist a gas sand adjacent the hydrocarbon-liquid, i.e., oil, sand and the gas can intrude into the bore hole in excessive amounts, thereby interfering with the production of hydrocarbon. In such instances, the formation can be treated in accordance with the invention to shut off the flow of water or free excess gas. The method of carrying out such a high water or high gas shutoff treatment is substantially the same as described above in connection with fluid drive operations. In any of the above-described embodiments of the invention, a slug of polymer containing no components of the redox catalyst system can be injected ahead of the aqueous compositions of the present invention. The untreated polymer can thus be used to satisfy the absorption requirements of the formation when this is desired. The initial injection of untreated polymer sometimes aids in reducing face plugging where this is a problem.

It is also within the scope of the invention to carry out the techniques of the invention periodically or intermittently, as needed, during the course of the fluid drive secondary operation, or during the production of oil, gas or water from a producing well.

In all of the above operations, the injection of the aqueous compositions can be carried out in conventional manner. The aqueous mixtures of the various components of the present invention can be prepared in advance, stored in suitable tanks, and then pumped into the well in the desired sequence.

It is a particular feature of the invention that there is provided a great deal of flexibility in the make-up of the aqueous treating compositions and in the treating sequence. For example, in one embodiment, the polymer-containing composition can be introduced into the formation followed by the nonpolymer-containing composition. In one case, the polymer-containing composition can contain the reducing component; in which event, the nonpolymer-containing composition will have incorporated therein the oxidizing component, or an excess of the oxidizing component and a lesser amount of reducing component, or the oxidizing compound and one or more multivalent cations such as calcium$^{+2}$ or magnesium$^{+2}$, or an excess of the oxidizing component, a lesser amount of reducing component and one or more multivalent cations such as calcium $^{+2}$. In another case, the oxidizing component can be incorporated into the polymer-containing compositions and the nonpolymer-containing compositions will contain an appropriate amount of reducing component, as well as the lesser amount of oxidizing component and/or multivalent cations such as calcium$^{+2}$. Additionally, the order in which the treatment is effected can be reversed, e.g., the nonpolymer-containing compositions can be introduced into the formation ahead of the polymer-containing compositions. Additionally, the treating sequence can comprise injection with a nonpolymer-containing aqueous composition containing reducing agent or oxidizing agent followed by polymer-containing aqueous composition containing that component of the catalyst system not included in the nonpolymer-containing aqueous composition, followed by nonpolymer-containing aqueous composition having the same component of the catalyst systems as was incorporated into the initial composition and optionally containing both components of the catalyst system as well as the multivalent cations such as calcium $^{+2}$. Under these conditions, the amounts of oxidizing and reducing components can be the same. If desired, any or all of the aqueous treating solutions which contain an oxidizing or reducing component can be preceded by or followed by aqueous compositions which can contain polymer but which contain neither component of the catalyst system. This latter technique is effective to inhibit premature in situ gellation of the polymer(s) in the well bore, at the perforations or in the formation immediately adjacent the well bore.

The method of this invention and the improved performance resulting therefrom are shown in the following examples which are illustrations and are not intended as limitations of the scope of the appended claims.

EXAMPLE I

Combination Polymer Treatment in a High Permeability Sandstone Core

A linear displacement model (sandstone core) was prepared by mounting a core from the Morichal formation, Venezuela, in epoxy. The core was 2½ inches long and 1 inch in diameter, and was mounted in a horizontal position. Pressure taps were installed 1 centimeter from each end of the core. Sufficient pressure and volume information was recorded during a flooding test in order to measure the effectiveness of the combination polymer treatment in reducing the mobility to brine and to oil in that section of the core between the two aforementioned pressure taps. The data obtained during the test were used to calculate mobility values using Darcy's linear flow equation. Said equation can be written as follows:

$$(K/\mu) = (QL/A\Delta P)$$

wherein the factor $K/\mu$ represents mobility in millidarcys divided by the viscosity of the liquid, $Q$ represents flow rate in cubic centimeters per second, L represents the length of the core between the two pressure caps in centimeters, A represents the cross-sectional area of the core in square centimeters, and $\Delta P$ represents the differential pressure between the two pressure taps in atmospheres. Since $L$ and $A$ are constant for any given model, mobility can be readily calculated from $(Q/\Delta P)$.

The core was flooded in the following sequence to illustrate the invention:

1. Saturated with Morichal formation water;
2. Oil flooded to establish oil saturation with residual water present;
3. Water flooded to establish a residual waterflood oil saturation;
4. A slug of Betz Hi-Vis polyacrylamide solution containing an oxidant, sodium dichromate, was injected;
5. A slug of reducing agent, sodium hydrosulfite, in distilled water, was injected;
6. A second slug of Betz Hi-Vis polyacrylamide solution containing sodium dichromate was injected;
7. The core was brine flooded to measure the residual resistance factor to brine;
8. The core was again oil flooded to measure the final mobility to oil; and
9. The core was again flooded with brine to measure the final mobility to brine and the effects of the combination polymer treatment on the mobility to brine.

The residual resistance factor (RRF) can be defined as the initial permeability to brine divided by the final permeability to brine in the presence of gelled and entrapped polymer, and in the presence of residual oil saturation. The residual resistance factor to oil is the initial oil mobility in the presence of connate water divided by the final oil mobility following the combination polymer treatment.

Table I shows the results of the aforementioned combination polymer treatment on the Morichal core. The residual resistance factor to simulated Morichal formation water after the final oil flood was 17. This was measured after the core had been flushed with 1,200 pore volumes of brine. The residual resistance factor to oil was low, being 1.58. The combination polymer treatment reduced the mobility of brine much more than it reduced the mobility of oil. Had this treatment been done on an oil producer in an oil field, it would have reduced the water-oil ratio by a factor of (17 ÷ 1.58 = 10.7) 10.7. The combination polymer treatment reduced the permeability to brine by 94 percent while it only reduced permeability to oil by 37 percent.

The Betz Hi-Vis polyacrylamide is a proprietary product of the Betz Chemical Company and has about 27–32 percent of the carboxamide groups hydrolyzed to carboxyl groups, a nitrogen content of about 8 percent, and a reported approximate molecular weight of 15 to 16 million.

To illustrate the effectiveness of the above-described in situ gellation technique, three core flood tests were run where conventional polymer treatments were applied using only one slug of polymer followed by brine flushes, in cores having effective permeabilities to Morichal formation water ranging from 2,200 to 2,500 millidarcys. With the single polymer treatments and no gellation, residual resistance factors to Morichal formation water ranged from 1.03 for Polyfloc 1,160, 1.1 for Dow Pusher 1,000, and 1.2 for Calgon WC–500. Each of these three polymers is partially hydrolyzed polyacrylamides which have been used in oil-producing wells in the field. The residual resistance factors were measured after the cores had been treated with 1,500 ppm polymer solutions and then flushed with approximately 10 pore volumes of Morichal formation water. The low residual resistance factors indicate the relative ineffectiveness of polymer solutions in producing a lasting reduction in the mobility to brine in highly permeable porous media. The in situ gelled polymer treatments certainly offer an improvement.

TABLE I

REDUCTION OF WATER AND OIL MOBILITY WITH POLYMER SOLUTIONS DISSOLVED IN SIMULATED MORICHAL RIVER WATER 9CTC

| | |
|---|---|
| Effective Permeability to Simulated Morichal Formation Water, Millidarcys | 2,900 9CTC |
| Effective Permeability to Simulated Morichal Formation Water at Residual Oil Saturation, Millidarcys | 2,700 9CTC |
| Residual Resistance Factor to Simulated Morichal Formation Water [a] Following Gellation of Polymer In Situ, RRF | 49 9CTC |
| Volume of Simulated Morichal Formation Water Flushed Through Core, Pore Volumes | 243 9CTC |
| Residual Resistance Factor to Oil, RRF | 1.58 9CTC |
| Residual Resistance Factor to Simulated Morichal Formation Water After Oil Flood, RRF | 17 9CTC |
| Volume of Simulated Morichal Formation Water Flushed Through Core, Pore Volumes | 1,200 |

[a]The in situ gellation treatment consisted of the injection of two pore volumes of 2,500 ppm Betz Hi-Vis and 1,250 ppm sodium dichromate separated by a one pore volume slug containing 1,250 ppm sodium hydrosulfite. All solutions were dissolved in simulated Morichal River water. Simulated Morichal water is fresh water containing only 40 parts per million of dissolved solids while the simulated Morichal formation brine contains 38,000 parts per million of dissolved solids.

EXAMPLE II

Reduction of Brine Mobility in Dolomite Cores from Western Kansas

Five core flood tests were run to evaluate the effectiveness of gelling polyacrylamides in situ as compared to single polymer treatments with no gellation. The tests were conducted in cores from the Arbuckle formation of the Bitter No. 2 Well in the Trapp Field, Barton County, Kansas. The cores were mounted in the horizontal position and had the dimensions of 1 inch in diameter by approximately 3 inches long. A pressure tap was installed approximately 1 centimeter downstream of the inlet face of the core. The cores had previously been mounted in epoxy sleeves covered by an aluminum tube. During water diversion tests in these five cores, pressures were measured at the inlet, at the pressure tap, and injection rates were measured while each of the fluids was being injected. This allowed the measurement of residual resistance factors to brine and to oil after the single polymer treatments and after combination polymer treatments. Results of the five core flood tests are shown in Table II. Three polyacrylamides, Dowel J–217, Betz Polyfloc 1110 and Calgon WC–500, were evaluated in the single polymer treatments. Two of the cores were given combination polyacrylamide treatments where the Betz Hi-Vis polymer was partially gelled in situ. The tests were run to simulate the treatment of Arbuckle producing wells to reduce water-oil ratios.

The data in Table II for the single treatments with polyacrylamides suggest the polyacrylamides would elute from the high permeability zones quickly and, therefore, the treatment would be ineffective. This is evidenced by the low residual resistance factors to brine ranging from 1.00 to 1.43. On the other hand, significant plugging and water diversion can be obtained by the use of a combination polymer treatment outlined in the footnotes of Table II, which produces the *in situ* crosslinking of polymer molecules that are adsorbed and/or entrapped. Test No. 4 in Table II shows the brine permeability was reduced 85 percent while the oil mobility was reduced by 75 percent by the use of Betz Hi-Vis in combination with the trivalent chromium where the chromium valence was reduced in situ from +6 to +3. Test No. 5 shows a loss in brine permeability of 98 percent and a smaller loss in oil mobility of about 90 percent. In two later tests of the combination polymer treatment, it was learned that by continuing the injection of oil that the mobility to oil would increase so the final oil mobility would be 50–60 percent of the original value, while the brine mobility remained at a low level.

It can be concluded from the data in Table II that *in situ* gellation of polyacrylamides is an improvement over conventional polymer treatments in that larger water diversion effects can be created by gelling the polyacrylamides in situ.

TABLE II

REDUCTION OF BRINE MOBILITY IN CORES FROM THE TRAPP FIELD, BARTON AND RUSSELL COUNTIES, KANSAS, BY TREATMENT WITH 1000 PPM SOLUTIONS OF POLYACRYLAMIDES

| Test No. | Flooding solution | Initial[a] brine mobility $(K/\mu)$, (md/cp) | Residual resistance factor to arbuckle brine (RRF) | Residual resistance factor to oil (soltrol 170) |
|---|---|---|---|---|
| | Single polymer treatment: | | | |
| 1 | Dowell J–217 | 172 | 1.08 | 1.25 |
| 1 | Polyfloc 1110 | 84 | 1.00 | 0.93 |
| 3 | Calbon WC–500 | 17.6 | 1.43 | 1.295 |
| | Combination polymer treatment c and d: | | | |
| 4 | Betz Hi-Vis | 83 | [c] 6.6 | 3.94 |
| 5 | Betz Hi-Vis | [b] 3800 | [d] 37.2 | 12.0 |

[a] Permeability to brine measured in downstream section of core while flooding in reverse direction.
[b] A hairline fracture or small "vug" is suspected.
[c] Core was flooded in following sequence—brine forward, oil reverse, brine forward and reverse, 1000 ppm Hi-Vis plus 250 ppm of $Na_2S_2O_4$, brine plus 250 ppm of each $Na_2S_2O_4$ and $Na_2Cr_2O_7$, 1000 ppm Hi-Vis, 250 ppm $Na_2S_2O_4$, brine plus 250 ppm of $Na_2S_2O_4$ and $Na_2Cr_2O_7$, brine reverse direction, and finally oil in reverse direction.
[d] Sodium dichromate was added to polymer solution instead of sodium hydrosulfite as in (c) above.

EXAMPLE III

Field Tests of the In situ Gellation Technique

Because of the favorable laboratory results described in Example II, the combination treatment process was used in treating oil-producing wells utilizing the in situ crosslinking and gellation of Betz Hi-Vis polyacrylamide. Tables III and IV provide the actual field reports describing the in situ gellation treatments on each of the two producing wells. The positive effect in reducing the water-oil ratio is also shown. The combination polymer treatment of the well A has been considered a very successful and long-lasting treatment by the field engineers as compared to conventional treatment of other producing wells with the Dowell J-217 polyacrylamide. In treating well A, the sodium dichromate, which provided the chromium cations for gellation, was not mixed with the polyacrylamide. It was injected in brine slugs ahead of and in between two slugs of polymer solution. Therefore, gellation and water diversion were dependent on the dichromate brine solution fingering into the slugs of polymer solution which contained the reducing agent. Because of the mobility difference between the solutions, only a fraction of the polymer would be gelled in situ. Six months after application of the treatment, well A was still producing approximately 25 to 30 barrels of oil per day, which was twice the initial oil rate of 14 barrels per day. These results indicate the in situ gellation treatment was particularly effective in reducing the water-oil ratio of this well.

Treatment of well B reduced the overall productivity of the well by a factor of 4.25, which suggests the in situ gellation of polyacrylamides is effective in reducing the mobility, particularly the mobility of brines.

TABLE III

WELL A

Average Daily Production 9CTA

|  | Oil, BPD | Water, BPD | WOR |
|---|---|---|---|
| Before Treatment | 14 | 774 | 55.3:1 |
| After Treatment | 31 | 1014 | 32.7:1 |

The well was acidized with 750 gallons of 15 percent iron-stabilized hydrochloric acid. After flushing the acid treatment with 30 barrels of brine at a pumping rate of 2 BPM and 0 psi, the well was treated as follows:
1. 7 pounds sodium dichromate in 160 bbl brine, 2 BPM, 150 psi TP.
2. 50 bbl brine, 2 BPM, 150 psi TP.
3. 678 pounds Betz Hi-Vis and 70 pounds sodium hydrosulfite in 2,168 bbl of brine. Initial rate 2 BPM at 150 psi TP, final rate 2 BPM at 550 psi TP.
4. 55 bbl brine, 2 BPM, 55 psi TP.
5. 50 pounds sodium dichromate and 50 pounds sodium hydrosulfite in 696 bbl brine. Initial rate 2.3 BPM at 550 psi TP, final rate 1.5 BPM at 550 psi TP, average rate 1.8 BPM.
6. 53 bbl brine at 1.5 BPM, 550 psi TP.
7. 650 pounds Betz Hi-Vis and 65 pounds of sodium hydrosulfite in 1,652 bbl of salt water. Initial rate 1.5 BPM at 550 psi TP, final rate 1.2 BPM at 850 psi TP, average rate 1.4 BPM.
8. 100 bbl brine at 1.4 BPM, 850 psi TP, final press, 820 psi TP.
9. 35 pounds of sodium dichromate and 35 pounds of sodium hydrosulfite in 500 bbl brine at 1.4 BPM and 820 psi TP.
10 1,000 bbl brine with 26 gallons biocide and 26 gallons corrosion inhibitor in the final 50 bbl. Injection rate 1.4 BOM at 830 psi TP.
11. 150 bbl lease crude oil with 55 gallons oil wetting agent. Injection rate 1.3 BPM at 900 psi TP.
12. Following the injection of lease crude oil, the well was shut in for three days before resuming production.

TABLE IV

WELL B

Average Daily Production 9CTA

|  | Oil, BPD | Water, BPD | WOR |
|---|---|---|---|
| Before Treatment | 7 | 683 | 97.6:1 |
| After Treatment | 6 | 410 | 68.3:1 |

The well was acidized with 750 gallons of 15 percent regular hydrochloric acid. After displacing the acid into the formation with brine, the well was treated as follows:
1. 150 bbl. formation water, 2 BPM, Vac. SD 2½ hrs.
2. 500 lb. Betz Hi-Vis and 133 lb. sodium dichromate in 932 bbl formation water. Average rate 1.55 BPM. First 571 bbl formation water pumped on vacuum. TP 150 psi after 932 bbl. formation water.
3. 50 bbl. formation water, 1.7 BPM, 150 psi TP.
4. 200 bbl. formation water, with 30 lb. sodium hydrosulfite, 1.2 BPM, 150 lb. TP.
5. 50 bbl. formation water, 1.25 BPM, 150 psi TP.
6. 500 lb. Betz Hi-Vis and 133 lb. sodium dichromate in 910 bbl. formation water. Average rate 1.1 BPM. TP increased from 150 psi at start of step 6 to 500 psi after 720 bbl. pumped. TP 800 psi at end of step 6.
7. 50 bbl. formation water, 0.6 BPM, 800 psi TP.
8. 200 bbl. formation water with 30 lb. sodium hydrosulfite, 1.4 BPM, 800 psi TP.
9. 108 bbl. formation water, 0.5 BPM, 800 psi TP. Note: Water Supply off — SD 1½ hours.
10. 50 bbl. water formation with 26 gallons corrosion inhibitor and 25 gallons biocide. 1.1 BPM, 800 psi TP.
11. 130 bbl. lease crude oil with 55 gallons oil wetting agent, 0.45 BPM, 750 psi TP.
12. Following the injection of lease crude oil, the well was shut in for six days before pumping was resumed.

EXAMPLE IV

In Situ Gellation of a Polyacrylamide in a Sandstone Core

Two tests were run using sandstone cores from the Burbank Field, Osage County, Oklahoma. The laboratory core preparation and flooding procedures were very similar to those described in Example II above. In this case, only one slug of polymer solution was injected followed by the injection of a reducing agent to partially gel the adsorbed or entrapped polymer. The sequence of flooding was to saturate the core with synthetic produced brine, having a total solids content of approximately 88,000 ppm followed by an oil flood using Soltrol 170, having a viscosity if 3 centipoises at room temperature. The core was then flooded with synthetic produced brine to a residual oil saturation at a water-oil ratio in excess of 200:1. One core which had an effective permeability to water of 450 millidarcys was then flooded with several pore volumes of a polymer solution containing 1,500 ppm of Dow Pusher 1,000, a high molecular weight partially hydrolyzed polyacrylamide, plus 1,000 ppm of sodium dichromate dihydrate. The polymer solution was prepared using a fresh water, synthetic Arkansas River water, which had a solids content of 1,200 ppm. Following injection of the polymer-dichromate solution, a slug of distilled water containing 5 percent by weight of sodium hydrosulfite (a reducing agent) was injected. Following this, the core was flooded with synthetic produced brine at a flooding velocity of approximately 12.5 feet per day. The core was again flooded with oil in order to measure the residual resistance factor to oil. After the oil flood the core was again flooded with synthetic produced brine. The final residual resistance factor to oil was 2.95 while the residual resistance factor to brine following the final oil flush was 10.0.

In the second core flood test, the flooding steps were essentially identical, except the permeability of this core to brine was 120 millidarcys and instead of Dow Pusher 1,000, Betz Hi-Vis polyacrylamide was used. The residual resistance factor to oil was 17.2 while the residual resistance factor to brine was 300. It can be concluded from the aforementioned core flood tests that in situ gellation of polyacrylamides is an effective water diversion agent. The method of this invention can also be accomplished by the injection of only one slug of polymer solution. Had two slugs of polymer solution been injected, it is probable that even greater reductions in mobility to brine could have been obtained.

Certain chemicals referred to in one or more of the examples by manufacturer's trade names are further identified as follows:

| Chemical | Type | Manufacturer | Mol. wt. million | Carboxamide groups hydrolyzed to carboxyl groups, (percent) | Nitrogen content (percent) |
|---|---|---|---|---|---|
| Dowell J-217 | Partially hydrolyzed polyacrylamide | Dow Chem. Co., Midland, Mich. | – | 11 | 15 |
| Dow Pusher 1000 | do | do | 10 | 21 | 11.9 |
| Polyfloc | do | Betz Laboratories, Los Angeles, Calif. | 9.7 | 11 | 13 |
| Betz Hi-Vis | do | do | 15–16 | 27–32 | 7.9 |
| Calgon WC-500 | do | Calgon Corp., Pittsburgh, Pa. | ≈16 | 15 | 15 |

Soltrol 170: Phillips Petroleum Co., Bartlesville, Oklahoma; odorless mineral spirits; Boiling range, 420–460° F.; Flash point, 185° F. (ASTM D-56); Aniline point, 196° F.; Kauri Butanol value, 24.0.

Reasonable variations and modifications are possible within the scope of this disclosure without departing from the spirit and scope thereof.

We claim:

1. A method for reducing fluid permeability of a porous hydrocarbon-containing subterranean formation comprising sequentially contacting said formation with an aqueous composition containing at least one crosslinkable polymeric material and having incorporated therein at least one of a single component selected from the group consisting of the reducing component of a reducing-oxidizing catalyst system or the oxidizing component of a reducing-oxidizing catalyst system; and an aqueous composition essentially free of crosslinkable polymeric material and having incorporated therein, when said crosslinkable polymeric material-containing aqueous composition has incorporated therein at least one reducing component of said catalyst system, at least an oxidizing component of said catalyst system, or, when said crosslinkable polymeric material-containing aqueous composition has incorporated therein at least one oxidizing component of said catalyst system, at least a reducing component of said catalyst system.

2. A method according to claim 1 wherein said crosslinkable polymeric material is selected from the group consisting of at least water-dispersible polyacrylamides, cellulose ethers or polysaccharides.

3. A method according to claim 2 wherein said aqueous compositions essentially free of crosslinkable polymeric materials have additionally incorporated therein at least one multivalent cation.

4. A method according to claim 2 wherein said formation is contacted with an aqueous composition essentially free of reducing and oxidizing components of said catalyst system spaced between said polymeric material-containing aqueous composition and said nonpolymeric material-containing aqueous composition.

5. A method according to claim 4 wherein said aqueous composition essentially free of reducing and oxidizing components has incorporated therein at least one crosslinkable polymeric material.

6. A method according to claim 1 comprising:
   introducing into said formation a first aqueous composition containing at least one crosslinkable, at least water-dispersible polymeric material and a sensible amount of at least one of a single component selected from the group consisting of the reducing component of a reducing-oxidizing catalyst system or the oxidizing component of said reducing-oxidizing catalyst system;
   terminating the introduction of said first aqueous composition into said formation;
   introducing into said formation a second aqueous composition, said second aqueous composition being essentially free of crosslinkable polymeric material, said second aqueous composition having incorporated therein, when said first aqueous composition has incorporated therein at least one of said reducing components of said catalyst system, at least an oxidizing component of said catalyst system, or, when said first aqueous composition has incorporated therein at least one of said oxidizing components of said catalyst system, at least a reducing component of said catalyst system;
   terminating the introduction of said second aqueous composition; and
   maintaining said composition in a quiescent state for a period of time to effect mixing of said first and second aqueous compositions and in situ crosslinking of said polymeric material.

7. A method according to claim 6 wherein there is introduced into said formation, prior to the introduction of said second aqueous composition, an aqueous composition essentially free of reducing and oxidizing components of said catalyst system.

8. A method according to claim 8 comprising:
   introducing into said formation a first aqueous composition containing at least one acid selected from the group consisting of organic and inorganic acids;

terminating the introduction of said first aqueous composition;

introducing into said formation a second aqueous composition containing a sensible amount of at least one oxidizing component of a reducing oxidizing catalyst system;

terminating the introduction of said second aqueous composition;

introducing into said formation a third aqueous composition containing at least one crosslinkable, at least water-dispersible polymeric material and a sensible amount of at least one reducing component of said reducing-oxidizing catalyst system;

terminating the introduction of said third aqueous composition;

introducing into said formation a fourth aqueous composition containing a sensible amount of an admixture of at least one reducing component and at least one oxidizing component of said catalyst system; said fourth aqueous composition being essentially free of crosslinkable polymeric material;

terminating the introduction of said fourth aqueous composition;

introducing into said formation a fifth aqueous composition containing at least one crosslinkable, at least water-dispersible polymeric material and a sensible amount of at least one reducing component of said reducing-oxidizing catalyst system;

terminating the introduction of said fifth aqueous composition;

introducing into said formation a sixth aqueous composition containing a sensible amount of an admixture of at least one reducing component and at least one oxidizing component of said reducing-oxidizing catalyst system;

terminating the introduction of said sixth aqueous composition;

introducing into said formation a seventh composition comprising fluid petroleum;

maintaining said composition in a quiescent state for a period of time to effect mixing of said compositions and in situ crosslinking of said polymeric material; and thereafter returning said well to production of fluid hydrocarbon.

9. A method according to claim 8 wherein there is introduced into said formation prior to the introduction of said second, third, fourth, fifth, sixth and seventh compositions an aqueous composition essentially free of crosslinkable polymeric material and essentially free of reducing and oxidizing components of said reducing-oxidizing catalyst system.

10. A method according to claim 9 wherein said reducing component of said reducing-oxidizing catalyst system incorporated into said third, fourth, fifth and sixth compositions is sodium hydrosulfite; said oxidizing component of said reducing-oxidizing catalyst system incorporated into said second, fourth and sixth compositions is sodium dichromate; said polymeric material incorporated into said third and fifth compositions is partially hydrolyzed polyacrylamide; said acid incorporated into said first composition is hydrochloric acid; said aqueous composition introduced into said formation prior to said seventh composition has incorporated therein at least one biocide and at least one corrosion inhibitor; and said seventh composition is lease crude oil.

11. A method according to claim 6 wherein there is introduced into said formation an aqueous composition containing at least one acid selected from the group consisting of inorganic and organic acids prior to the introduction into said formation of said first aqueous composition.

12. A method according to claim 11 comprising:

introducing into said formation a first aqueous composition containing at least one acid selected from the group consisting of organic and inorganic acids;

terminating the introduction of said first composition;

introducing into said formation a second aqueous composition containing at least one crosslinkable, at least water-dispersible polymeric material and a sensible amount of at least one oxidizing component of a reducing-oxidizing catalyst system;

terminating the introduction of said second composition;

introducing into said formation a third aqueous composition having incorporated therein a sensible amount of at least one reducing component of said reducing-oxidizing catalyst system;

terminating the introduction of said third composition;

introducing into said formation a fourth aqueous composition containing at least one crosslinkable, at least water-dispersible polymeric material and having incorporated therein a sensible amount of at least one oxidizing component of said catalyst system;

terminating the introduction of said fourth composition;

introducing into said formation a fifth aqueous composition having incorporated therein a sensible amount of at least one reducing component of said catalyst system;

terminating the introduction of said fifth composition;

introducing into said formation a sixth composition comprising fluid petroleum;

maintaining said composition in a quiescent state for a period of time to effect mixing of said compositions and in situ crosslinking of said polymeric material; and thereafter returning said well to production of fluid hydrocarbon.

13. A method according to claim 12 wherein there is introduced into said formation prior to the introduction of said second, third, fourth, fifth and sixth compositions an aqueous composition essentially free of crosslinkable polymeric material and essentially free of reducing and oxidizing components of said catalyst system.

14. A method according to claim 13 wherein said acid is hydrochloric acid; said reducing component is sodium hydrosulfite; said oxidizing component is sodium dichromate; said polymeric material is partially hydrolyzed polyacrylamide; said fluid petroleum is lease crude oil; and said aqueous composition introduced into said formation prior to said sixth composition has incorporated therein at least one biocide and at least one corrosion inhibitor.

15. A method according to claim 11 comprising:

introducing into said formation a first aqueous composition having incorporated therein at least one acid selected from the group consisting of inorganic and organic acids;

terminating the introduction of said first composition;

introducing into said formation a second aqueous composition having incorporated therein a sensible amount of at least one reducing component of a reducing-oxidizing catalyst system;

terminating the introduction of said second composition;

introducing into said formation a third aqueous composition containing at least one crosslinkable, at least water-dispersible polymeric material and having incorporated therein a sensible amount of at least one reducing component of said catalyst system;

terminating the introduction of said third composition;

introducing into said formation a fourth aqueous composition having incorporated therein a sensible amount of at least one oxidizing component of said catalyst system;

terminating the introduction of said fourth composition;

introducing into said formation a fifth aqueous composition containing at least one crosslinkable, at least water-dispersible polymeric material and having incorporated therein a sensible amount of at last one reducing component of said catalyst system;

terminating the introduction of said fifth composition;

introducing into said formation a sixth aqueous composition having incorporated therein a sensible amount of at least one reducing component of said catalyst system;

terminating the introduction of said sixth composition;

introducing into said formation a seventh composition comprising fluid petroleum;

maintaining said compositions in a quiescent state for a period of time to effect mixing of said compositions and in situ crosslinking of said polymeric material; and thereafter returning said well to production of fluid hydrocarbon.

16. A method according to claim 15 wherein there is introduced into said formation prior to the introduction of said fourth and fifth compositions an aqueous composition essentially free of crosslinkable polymeric material and essentially free of reducing and oxidizing components of said catalyst system.

17. A method according to claim 16 wherein said acid is hydrochloric acid; said reducing component is sodium hydrosulfite; said oxidizing compound is sodium dichromate; said polymeric material is partially hydrolyzed polyacrylamide; and said fluid petroleum is lease crude oil.

18. A process according to claim 1 comprising:
introducing into said formation a first aqueous composition containing at least one component selected from the group consisting of the reducing component of a reducing-oxidizing catalyst system or the oxidizing component of said catalyst system, said first aqueous composition being essentially free of crosslinkable polymeric material;

terminating the introduction into said formation of said first aqueous composition;

introducing into said formation a second aqueous composition containing at least one crosslinkable, at least water-dispersible polymeric material and a sensible amount of at least one of a single component selected from the group consisting of the reducing component or the oxidizing component of a reducing-oxidizing catalyst system;

providing that, when said second aqueous system has incorporated therein at least one reducing component of said catalyst system, said first composition has incorporated therein at least an oxidizing component of said catalyst system; and when said second aqueous system has incorporated therein at least one oxidizing component of said catalyst system, said first aqueous system has incorporated therein at least a reducing component of said catalyst system;

terminating the introduction into said formation of said second aqueous composition; and maintaining said compositions in a quiescent state for a period of time to effect mixing of said first and second aqueous compositions and in situ crosslinking of said polymeric material.

* * * * *